(12) United States Patent
Magaldi

(10) Patent No.: US 7,958,991 B2
(45) Date of Patent: Jun. 14, 2011

(54) CONVEYOR BELT WITH OVERLAPPING PLANAR SURFACE PLATES

(75) Inventor: Mario Magaldi, Salerno (IT)

(73) Assignee: Magaldi Power S.p.A., Salerno (IT)

( * ) Notice: Subject to any disclaimer, the term of this patent is extended or adjusted under 35 U.S.C. 154(b) by 113 days.

(21) Appl. No.: 11/992,447

(22) PCT Filed: Sep. 20, 2006

(86) PCT No.: PCT/IB2006/002589
§ 371 (c)(1),
(2), (4) Date: Aug. 6, 2009

(87) PCT Pub. No.: WO2007/034289
PCT Pub. Date: Mar. 29, 2007

(65) Prior Publication Data
US 2010/0012456 A1    Jan. 21, 2010

(30) Foreign Application Priority Data
Sep. 21, 2005  (IT) ............................... MI2005A1745

(51) Int. Cl.
*B65G 17/06* (2006.01)

(52) U.S. Cl. ...................................... 198/850; 198/851
(58) Field of Classification Search ................... 198/831, 198/850, 853
See application file for complete search history.

(56) References Cited

U.S. PATENT DOCUMENTS

| | | | | |
|---|---|---|---|---|
| 2,954,113 A * | 9/1960 | Hibbard et al. | ............... | 198/851 |
| 3,653,494 A * | 4/1972 | Miller | ............. | 198/850 |
| 3,807,548 A * | 4/1974 | Bergeron | ............. | 198/850 |
| 4,078,654 A * | 3/1978 | Sarovich | ............. | 198/850 |
| 5,909,797 A * | 6/1999 | Van Den Goor | ............. | 198/851 |
| 7,044,290 B2 * | 5/2006 | Garbagnati et al. | ........... | 198/852 |

* cited by examiner

Primary Examiner — James R Bidwell
(74) Attorney, Agent, or Firm — Olson & Cepuritis, Ltd.

(57) ABSTRACT

A conveyor belt (1) includes a metallic net belt (8) functionally driven by at least a traction drum (5), tensioned by at least a return drum (12) and supported by a plurality of independent transversal rollers (13). Belt (1) supports individually a plurality of plates (2) partially overlapping one another, so as to form a flat continuous transport surface as a mobile reliable plane that is resistant to extreme mechanical stress. Each of said plates (2) is suitably shaped so that an upper portion of one plate overlaps a lower portion of the following plate.

14 Claims, 7 Drawing Sheets

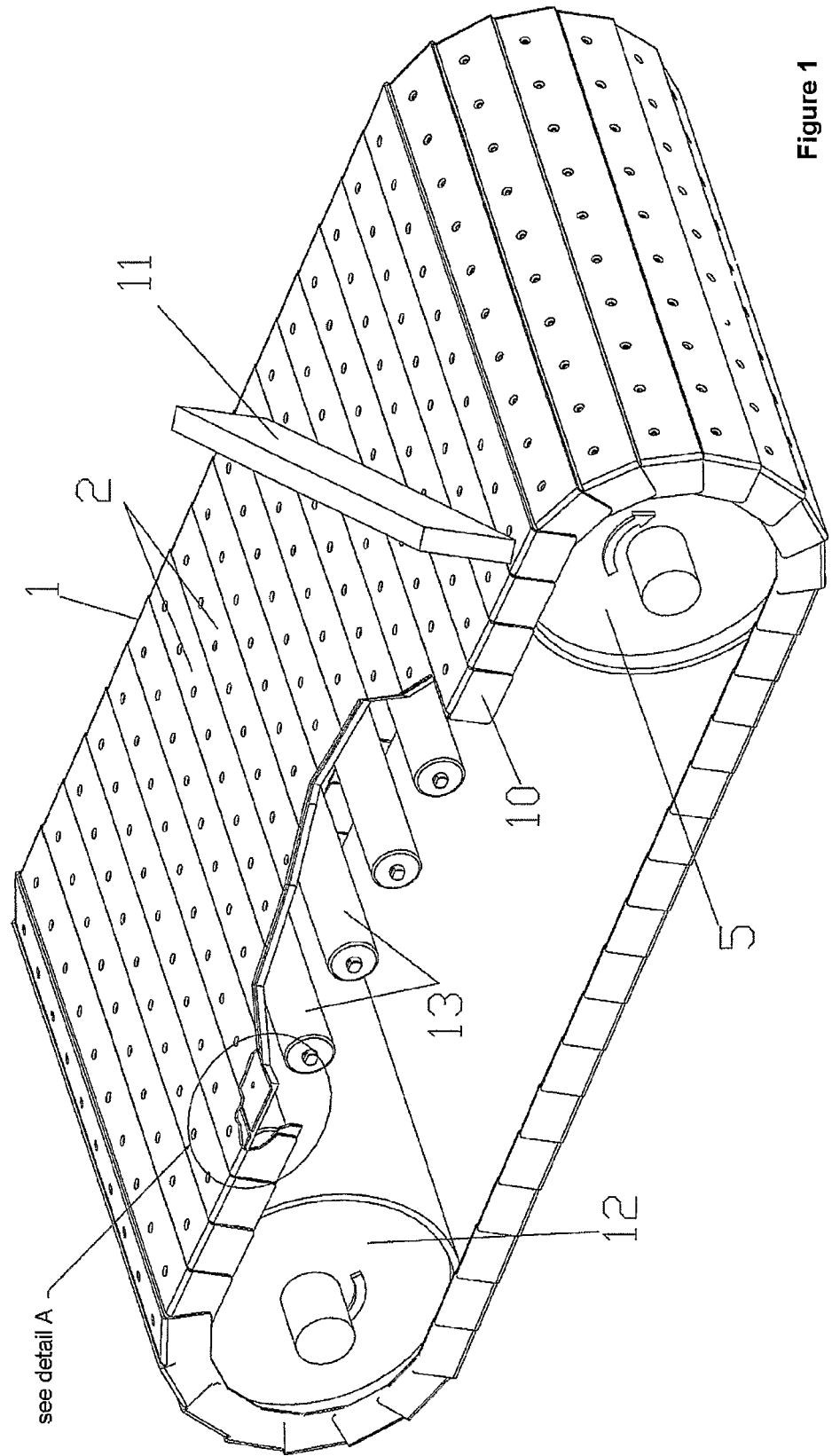

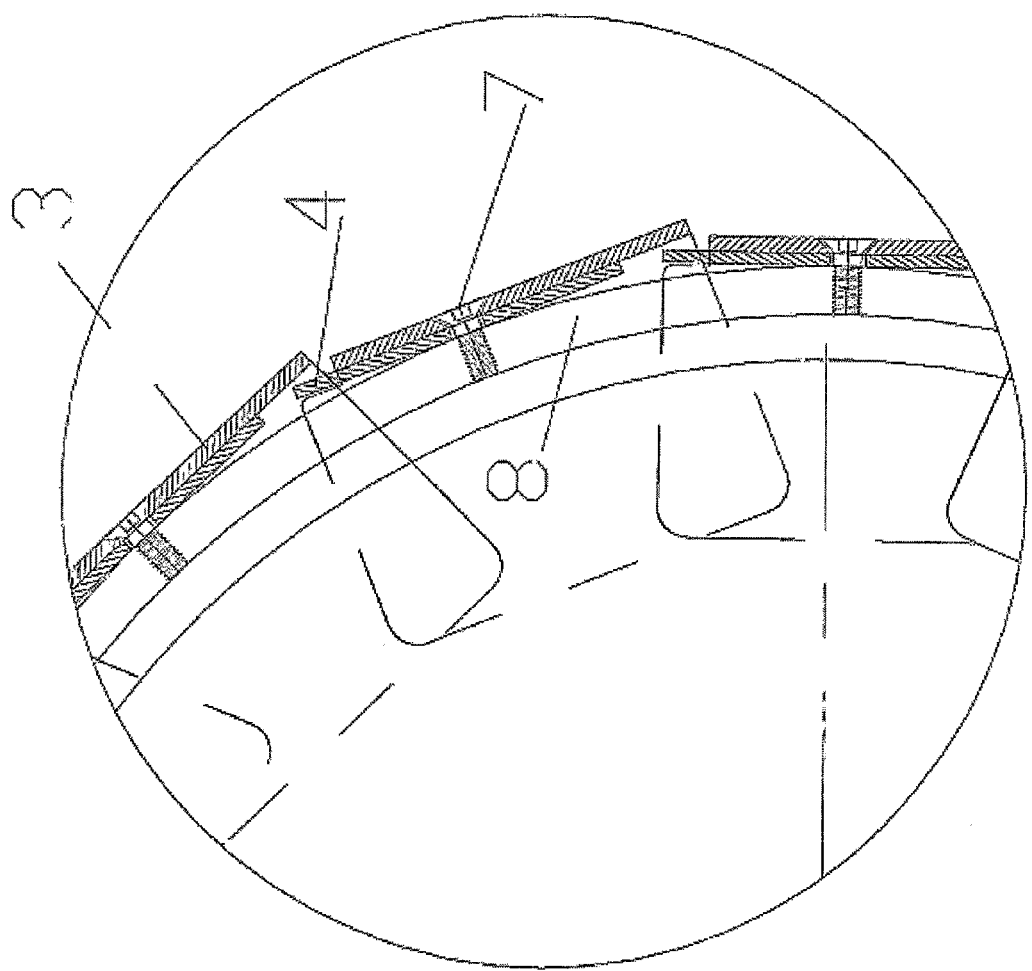

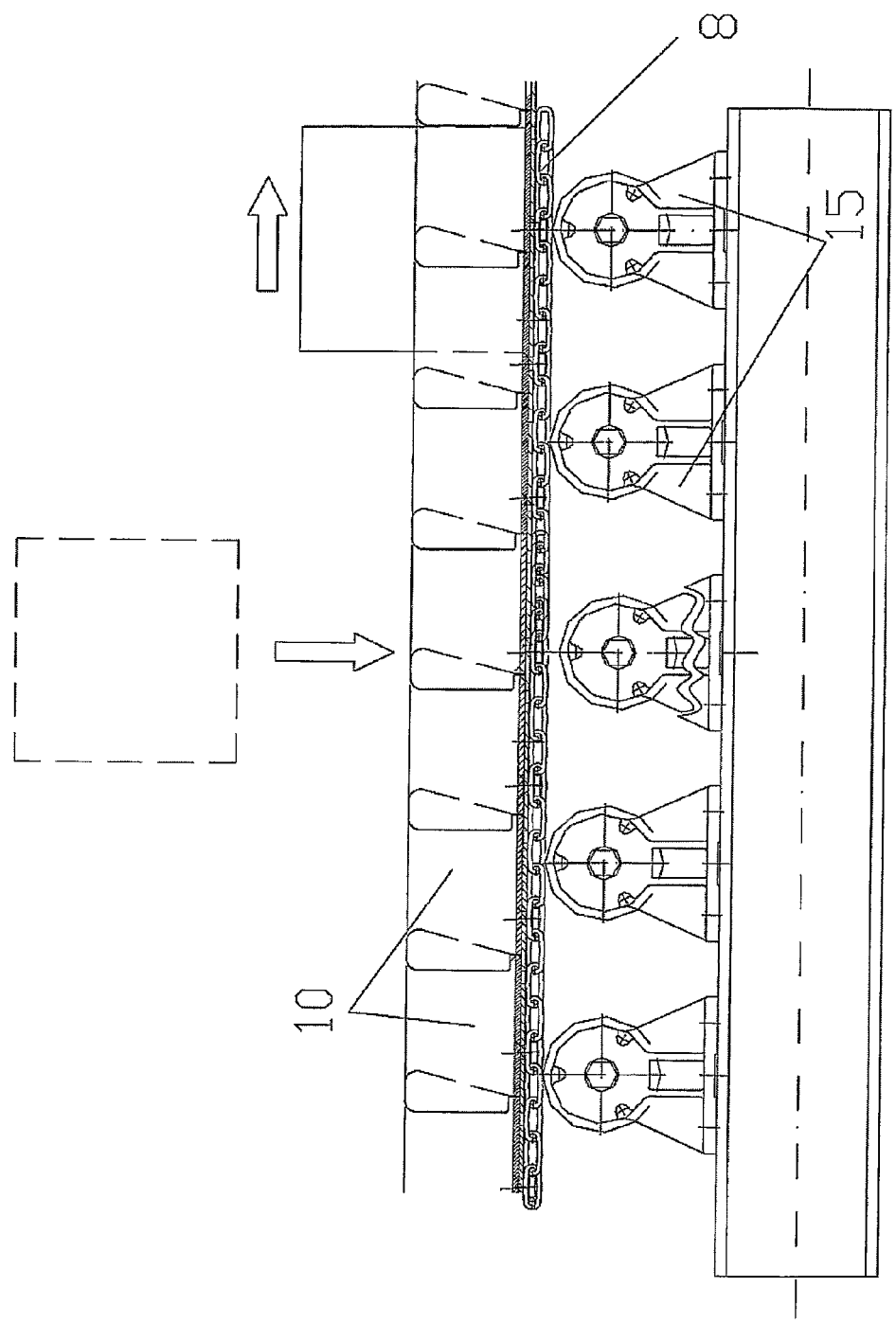

CONVEYOR BELT WITH OVERLAPPING PLANAR SURFACE PLATES

CROSS-REFERENCE TO RELATED APPLICATION

This application is the National Stage of International Application Serial No. PCT/IB2006/002589, filed on Sep. 20, 2008, the disclosure of which is incorporated herein by reference in its entirety.

FIELD OF INVENTION

The present invention is about a metallic conveyor belt with overlapping planar surface plates.

BACKGROUND OF INVENTION

It is common practice, by now, in transporting difficult material, especially at high temperatures, use of a kind of metallic belt conveyor comprising a metallic net traction element supporting a plurality of partially overlapping steel plates, such as to form an almost sealed load bearing channel. Each plate is subsequently individually fixed by a plurality of bolts, screws or rivets inserted in corresponding bored plaques, each of these plaques being in turn inserted inside the meshes of the traction net conveyor belt. The conveyor belt thus comprised is operated by a traction drum, it is tensioned by a transmission drum, ensuring the necessary tension, and is supported by a plurality of independent transversal rollers, supporting the conveyor belt on its load bearing section, and by wheels supporting the belt in its return section. Examples of conveyor belts of this kind are disclosed in U.S. Pat. Nos. 3,633,737 and 3,749,228, where material holding means overlap each other to form a continuous channel in which the material can be held and carried. However, the transport surface is not planar, having steps corresponding to the overlapping zone of the material holding means.

In conveyor belts according to prior art, the overlapping of plates generates a non planar surface, caused by partial imbricated overlapping of the plates in the direction of motion. Such embodiment constitutes a limit to the increase in thickness of the plates and therefore to the sturdiness of the assembly, due to the growing difficulty with the thickness of the plates, to slide on the return wheels. The presence of small ste causes a waste of power due to the energy absorbed to raise the conveyor belt at every passage of the small steps on the return wheels. This energy waste, besides, produces vibrations or noise.

The non planar surface of the conveyor belt on the load bearing section causes, in practice, hindrance to positioning deviators on the conveyor belt to laterally discharge transported materials, which would get stuck between the small steps formed by the overlapping of the plates and the deviator.

For similar reasons, it is impossible to create more channels on the same conveyor belt for the possible choice and separation of the transported material.

SUMMARY OF INVENTION

Moreover, an example of conveyor characterized by a planar transport surface is disclosed in U.S. Pat. No. 3,311,222, where load carrying members are bracketed to cables at each side of the conveyor frame, said carrying members having marginal side portions that allow meshing on the driving sprocket drum. This kind of conveyor is not dependable for continuous operation and extreme mechanical stress. In fact even the failure of only one of the two connection cables stops the conveyor operation. This occurrence is not possible for a metallic belt conveyor.

The above mentioned limits are overcome by the conveyor belt of the present invention, whose planar surface, does not create obstacles in applying deviation and/or separation devices and is able to operate as a mobile work plane, attaining handling reliabilty even in the presence of extreme mechanical stress.

In everyday practice of vertical mould lines, the cooling of the casting in mould parts, as it requires to be performed in absence of any vibration, rubber conveyor belts are used positioned just downstream of the casting point of the cast iron. During transport of the mould parts, the rubber belt undergoes severe early deterioration caused by the leakage of the cast iron which spills out in case of possible damage of the mould parts, with resulting production down time. These problems can be totally eliminated by the conveyor belt object of this invention, whose planar high temperature proof transport surface and its absence of vibration allow for a safe transport of the mould parts, without damaging them.

The absolute stiffness of the plane, the absence of vibrations and the perfectly flat planar surface make this invention fit to be used as a moving walkways, possibly even in association with working performed by personnel transported by the conveyor belt.

BRIEF DESCRIPTION OF DRAWINGS

The innovative features, aims and advantages of the present invention will become apparent from the following description and attached drawings, relating to non limitative embodiments, in which:

FIG. 1 is a partial sectional view of the conveyor belt according to the present invention, including the traction and return drums and load bearing rollers;

FIG. 2B is a view in detail of the wrapping phase of FIG. 2;

FIG. 5 represents a schematic view of the close roller pitch.

In this respect it is hereby noted that identical reference numbers in the various figures indicate identical or equivalent parts.

DESCRIPTION OF PREFERRED EMBODIMENTS

Figure 1A:
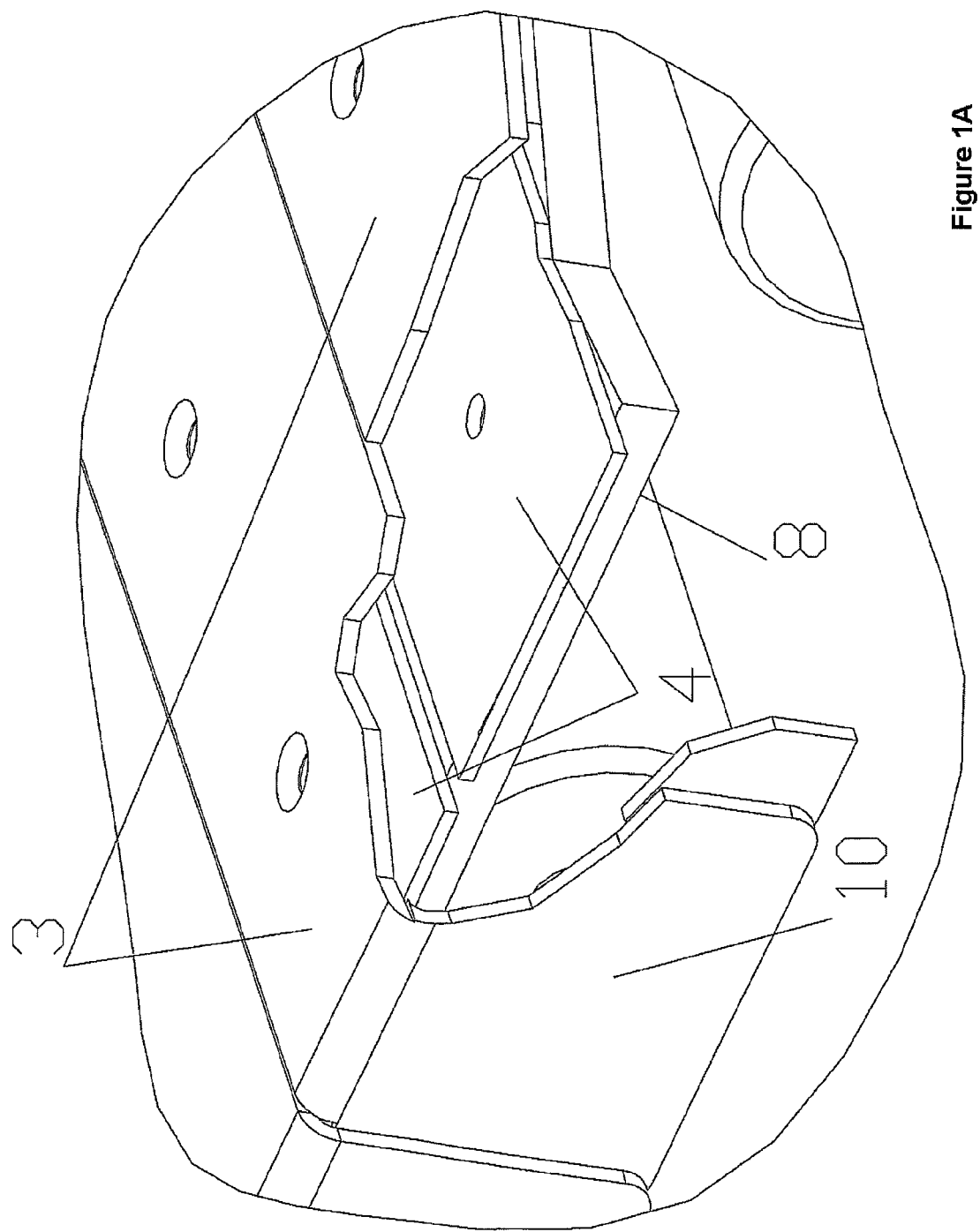
FIG. 1A is a view in detail of the plates of the conveyor belt of FIG. 1.
Figure 2:
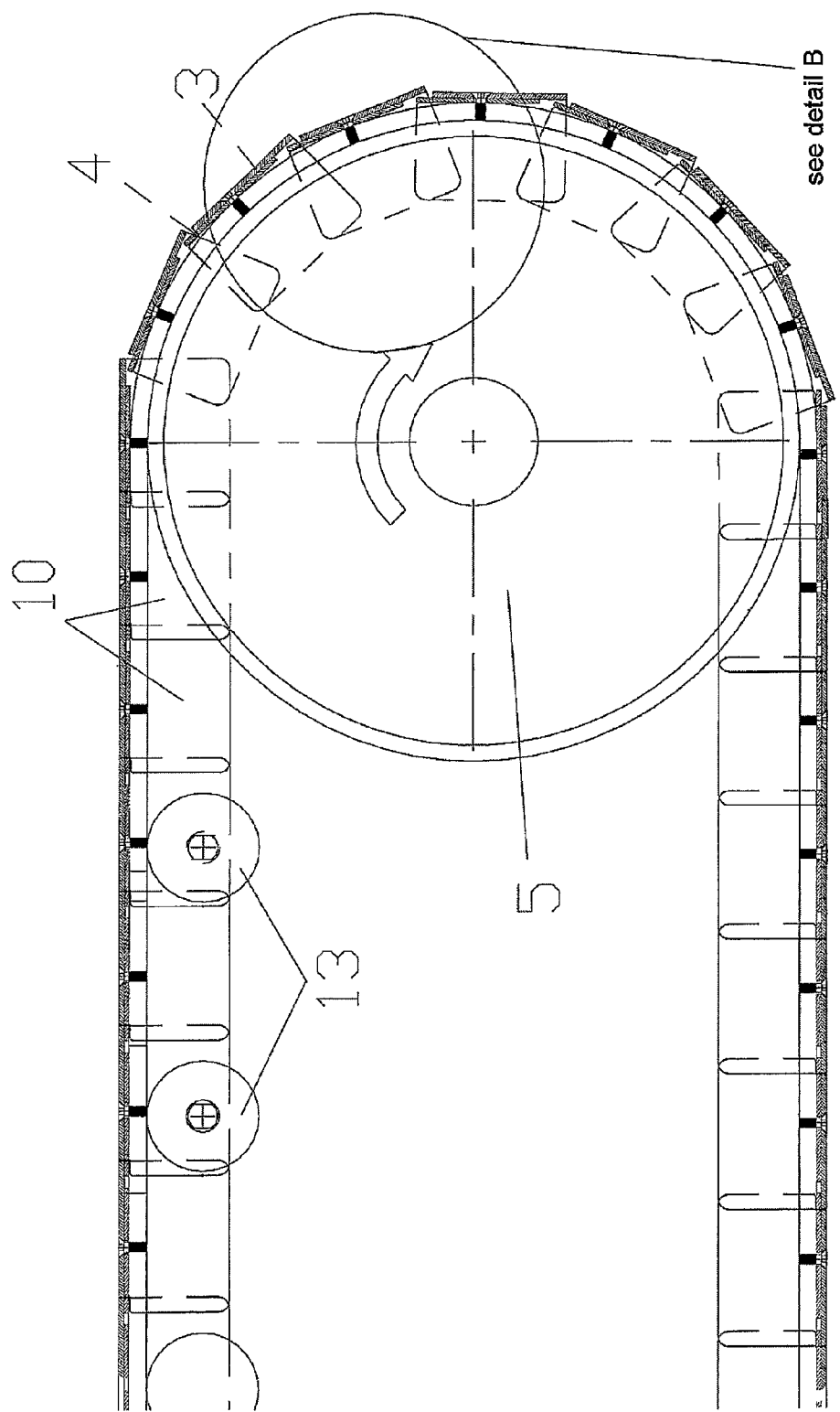
FIG. 2 represents a schematic view of the conveyor belt wrapping on the drum.
Figure 3:
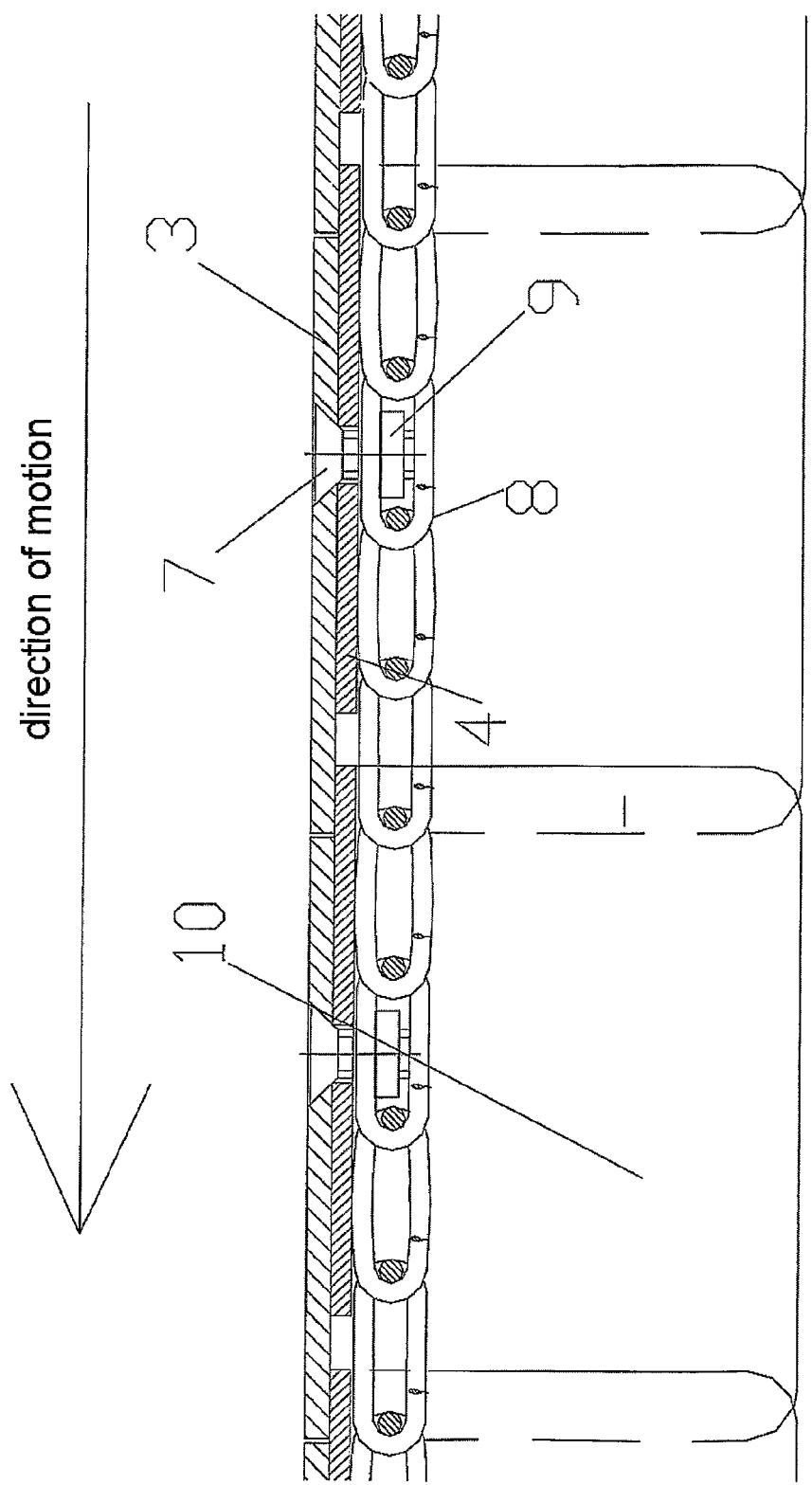
FIG. 3 is a cross sectional view of the conveyor belt according to the invention.

The conveyor belt 1 object of this invention, compared to a conveyor belt of known construction, provides a particular construction of the plates 2 such as the relative position between two consecutive plates makes the transport surface planar and continuous, turning it into a sturdy and reliable moving plane. This is particularly evident with reference to FIG. 1 of the attached drawings.

The conveyor belt 1 according to the present invention is able to operate even in the presence of extreme mechanical stress, deriving for example from the impact of heavy weights on the belt or mechanical stress due to working performed on the belt.

The conveyor belt 1 comprises a metallic net belt 8 (FIGS. 1A and 1B) representing the principal traction element, to which the plates 2 are fixed by means of screws 7, bolts or rivets and corresponding bored plaques 9, each of these bored plaques 9 being thereby inserted inside a mesh of the traction net 8. The shape of each plate 2, partially overlapping the following one, allows to attain a planar and continuous transport surface, keeping it closed to protect the supporting belt 8 even during rotation on the traction drum 5 and the return drum 12.

The conveyor belt 1 thus set up is operated by the traction drum 5, it is tensioned by the return drum 12, the latter assuring the necessary constant tension, and is supported by a plurality of transversal independent rollers 13, supporting the belt on the upper section, and by wheels (not shown), supporting the belt on the return section.

The planarity of the transport surface allows for the application of one or more deviators 11 and/or separation baffles 16, allowing to differentiate the transported material according to production requirements, avoiding the material to get stuck between the belt and the deviators 11, with subsequent abrupt stops of the conveyor belt.

An advantage deriving from the planarity of the transport surface and absence of vibrations is the possibility to transport components, like mould parts of the vertical moulding line during the cooling phase of cast iron, without damaging the mould part, nor the conveyor belt due to accidental spilling of cast iron during transport.

Additionally, the absolute sturdiness of the plane, the absence of vibrations and the perfectly planar surface without protrusions cause the conveyor belt according to the invention to be fit to be used as a mobile walkway, possibly even in association with working performed by personnel transported by the belt.

A possible embodiment of the conveyor belt 1 is obtained by coupling two plates 3 and 4 of different shape, fixing them by couples by means of bolts, screws or rivets 7 to corresponding bored plaques 9 inserted inside the metal net 8, where the upper plate 3 results partially overlapping over the following base plate 4. Plates 3 and 4 thus coupled stay integral and form a single body even when wrapping on drums 5. The bores on the lower plate 4 are slotted to allow for a differential expansion between the plates 3 and 4 due to different thermal conditions.

In case of such realization of plates 2, elements 3 and 4 may be of different thickness and different material from each other, allowing for both the ideal choice for the material in contact with the product to be transported, and the choice of the total thickness necessary to convey sturdiness to the conveyor belt according to transport needs.

For this reason, the conveyor belt object of this invention can be considerably sturdier than those according to prior art, because this configuration with coupled plates 3 and 4 fixed to the net traction belt 8 allows to use considerable thickness without any difficulty in sliding on the return wheels 14. The close pitch of the load bearing rollers 13 gives sturdiness and reliability to the conveyor belt 1, absorbing possible impacts deriving for example by heavy weights hitting the conveyor belt 1.

The resistance to mechanical stress of the high thickness overlapping plates 3 and 4 system, with close load bearing rollers 13, is further increased adopting supports 15 of the load bearing rollers provided with a breaking up point 14 with a calibrated resistance. these supports 15 allow to protect belt 1 from any mechanical stress, as they brake at the predetermined point when admitted stress is exceeded.

Since the pitch of the load bearing 13 is close, the possible break up of one or more supports 15 will be non influential on the normal running of the conveyor belt 1 and the substitution of supports 15 and relevant rollers 13 can be performed without the necessity to stop the conveyor belt 1.

Another possible embodiment of the conveyor belt 1 is that of making the plates 2 in one single piece, by machining or moulding, and they can further be made of plastic material, for example high density polyethylene, when it is necessary to warrant a low friction coefficient and when the materials to be transported are cold and not excessively abrasive.

Figure 4:
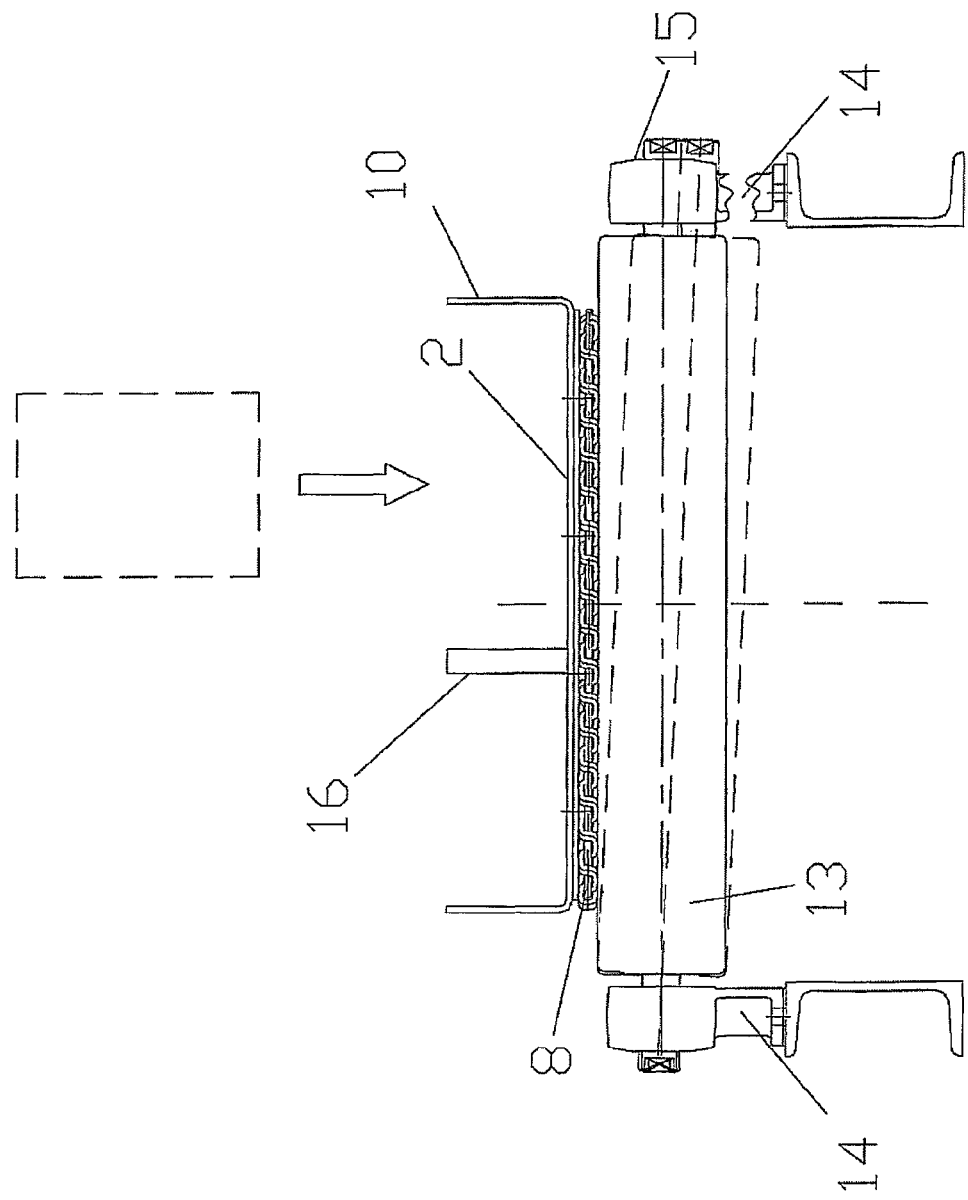
FIG. 4 is a front sectional view of the conveyor belt with its support calibrated.

According to transport needs and kind of material, the conveyor belt I can provide for lateral tabs 10 constituting extensions of the plates 2 which are turned either upwards (FIG. 4) or downwards (FIG. 1). In particular, the function of tabs 10 turned upwards (FIG. 4) is suitable to contain the transported material in case it is loose or small sized. The configuration with tabs 10 turned downwards (FIG. 1) is suitable in case a lateral discharge is required, by applying suitable deviators 11 or by action of the operator, allowing to simply push the workpieces towards the discharge points without the necessity to lift them.

It is apparent that to the embodiments described in this application by way of example and in a non limitative way, many modifications, adaptations, integrations, changes and substitutions of elements with functionally equivalent others may be performed, without falling out of the scope as defined by the following claims.

I claim:

1. A conveyor belt (1), comprising a metallic net belt (8) ctionally driven by at least a traction drum (5), tensioned by at a return drum (12) and supported by a plurality of independent transversal rollers (13), said belt (1) supporting individually a plurality of plates (2) partially overlapping one another, so as to form a flat continuous transport surface as a mobile reliable plane resistant to extreme mechanical stress, wherein each of said plates (2) is suitably shaped so that an upper portion of one late overlaps a lower portion of the following plate, wherein each of plates (2) comprises an upper plate (3) and a base plate (4), of which the upper plate (3) partially overlaps base plate (4) of the following plate (2) thereby forming a continuous surface to protect the supporting net belt (8) even when traveling around the drums (5, 12), and wherein an upper plate (3) is fixed together with a base plate (4) in a pair by a plurality of bolts, screws or rivets (7) to a plurality of plaques (9) inserted inside the metal net belt (8).

2. The conveyor belt (1) according to claim 1, where the plates (2) are provided with lateral tabs (10), turned upwards or downwards according to transport needs and kind of material transported.

3. A conveyor belt (1)comprising a metallic net belt (8) functionally driven by at least a traction drum (5), tensioned by at least a return drum (12) and supported by a plurality of independent transversal rollers (13) said belt (1) supporting individually a plurality of plates (2) partially overlapping one another, so as to form a flat continuous transport surface as a mobile reliable plane resistant to extreme mechanical stress, wherein each of said plates (2) is suitably shaped so that an upper portion of one plate overlaps a lower portion of the following plate, further comprising supports (15) for load bearing rollers (13), said supports (15) including a breaking-up point (14) that is calibrated to break at a predetermined level of applied stress.

4. The conveyor belt (1) according to claim 1, further comprising one or more deviators (11), one or more separation baffles (16), or both, on the transport surface of the belt.

5. A low vibration method for transporting a person or vibration sensitive material from one point to another, the method comprising conveying the person or material on a conveyor belt comprising a metallic net belt (8) functionally driven by at least a traction drum (5), tensioned by at least a return drum (12) and supported by a plurality of independent transversal rollers (13), said belt (1) supporting individually a plurality of plates (2) partially overlapping one another, so as to form a flat continuous tranport surface as a mobile reliable plane resistant to extreme mechanical stress, wherein each of said plates (2) is suitable shaped so that an upper portion of one plate overlaps a lower portion of the following plate, and wherein a person performing a vibration sensitive task is transported on the conveyor belt while performing the task.

6. A conveyor belt, comprising a metallic net belt operated by at least a traction drum, tensioned by at least a return drum and supported by a plurality of independent transversal rollers, said belt supporting individually a plurality of plates partially overlapping one another, so as to form a flat continuous surface as a mobile reliable plane resistant to extreme mechanical stress, wherein each of said plates is suitably shaped so that the upper part of one plate overlaps the lower part of the following plate, wherein each of said plates is made by an upper element and a base element partially overlapped one to other in a staggered arrangement, of which the upper element is partially overlapping the base element of the following plate and the base element is partially underlying the upper element of the preceding plate, so as to form a continuous surface protecting the supporting belt even when travelling around the drums, which plate is made by a shaped single piece or by two distinct pieces.

7. The conveyor belt according to claim 6, where the elements are fixed by couple by means of a plurality of bolts, screws or rivets to a plurality of plaques inserted inside the metal net.

8. The conveyor belt according to claim 6, where the plates are provided with lateral tabs, turned upwards or downwards according to transport needs and kind of material transported.

9. The conveyor belt according to claim 6, where supports of the load bearing rollers are provided with a breaking up point with a calibrated resistance so that said supports break at the predetermined point when admitted stress is exceeded.

10. The conveyor belt according to claim 6, characterised by the presence of one or more deviators and/or separation baffles on the transport surface.

11. A method of use of the conveyor belt according to claim 6, where the mechanical stress due to the possible impact on the belt of the material transported is transferred to the supports of the load bearing rollers calibrated in such a way to break without affecting the continuity of motion of the conveyor belt.

12. The method according to claim 11, where the plates are made of a material which is metallic, synthetic or organic, and provided with one or more deviators allowing the lateral discharge of the material transported and/or channels to achieve the separation on the conveyor belt of materials or objects of different nature.

13. The method according to claim 12, where the absence of vibration and the presence of plates partially overlapping to form a flat continuous surface allow the transport of particular components without damaging the components during transport.

14. The method according to claim 1, where the belt can be also used for transporting people, which can possibly perform operation during the motion of the conveyor belt.

\* \* \* \* \*

UNITED STATES PATENT AND TRADEMARK OFFICE
CERTIFICATE OF CORRECTION

PATENT NO.        : 7,958,991 B2                                          Page 1 of 1
APPLICATION NO.   : 11/992447
DATED             : June 14, 2011
INVENTOR(S)       : Mario Magaldi It is certified that error appears in the above-identified patent and that said Letters Patent is hereby corrected as shown below:

Column 1,
Line 45, "ste" should be -- steps --.

Column 4,
Line 10, "belt I" should be -- belt 1 --.
Line 28, "ctionally" should be -- functionally --.
Line 29, before "a return" insert -- least --.
Line 35, "late" should be -- plate --.
Line 48, after (1) insert a -- , --.
Line 51, after (13) insert a -- , --.

Column 5,
Line 7, "suitable" should be -- suitably --.

Signed and Sealed this
Thirteenth Day of September, 2011

David J. Kappos
*Director of the United States Patent and Trademark Office*